US012129444B2

United States Patent
Despres et al.

(10) Patent No.: US 12,129,444 B2
(45) Date of Patent: Oct. 29, 2024

(54) STEAM CRACKING PROCESS COMPRISING A SEPARATION STEP AND DIFFERENTIAL TREATMENT OF THE OBTAINED PARTICLES ACCORDING TO A THRESHOLD VALUE

(71) Applicant: EUROPEENNE DE BIOMASSE, Paris (FR)

(72) Inventors: Jean-Luc Despres, Verzenay (FR); Thomas Habas, Paris (FR); Adriana Quintero-Marquez, Le Vesinet (FR); Frédéric Martel, Riems (FR)

(73) Assignee: EUROPEENNE DE BIOMASSE, Paris (FR)

( * ) Notice: Subject to any disclaimer, the term of this patent is extended or adjusted under 35 U.S.C. 154(b) by 206 days.

(21) Appl. No.: 17/597,055

(22) PCT Filed: Jun. 17, 2020

(86) PCT No.: PCT/FR2020/051045
§ 371 (c)(1),
(2) Date: Dec. 23, 2021

(87) PCT Pub. No.: WO2020/260799
PCT Pub. Date: Dec. 30, 2020

(65) Prior Publication Data
US 2022/0315851 A1    Oct. 6, 2022

(30) Foreign Application Priority Data

Jun. 24, 2019  (FR) ..................................... 1906796

(51) Int. Cl.
| | |
|---|---|
| *C10L 5/44* | (2006.01) |
| *B07B 1/00* | (2006.01) |
| *B09B 3/45* | (2022.01) |
| *B09B 101/85* | (2022.01) |
| *C10L 5/08* | (2006.01) |
| *C10L 5/36* | (2006.01) |

(52) U.S. Cl.
CPC ................ *C10L 5/442* (2013.01); *C10L 5/08* (2013.01); *C10L 5/363* (2013.01); *B07B 1/00* (2013.01); *B09B 3/45* (2022.01); *B09B 2101/85* (2022.01); *C10L 2200/0469* (2013.01); *C10L 2290/30* (2013.01); *C10L 2290/546* (2013.01)

(58) Field of Classification Search
CPC ......... B07B 1/00; B07B 2230/00; B09B 3/45; B09B 2101/85; C10B 49/02; C10B 53/02; C10L 5/08; C10L 5/363; C10L 5/44; C10L 5/442; C10L 2200/0469; C10L 2290/30; C10L 2290/546; Y02E 50/10; Y02E 50/30
See application file for complete search history.

(56) References Cited

U.S. PATENT DOCUMENTS

| | | | |
|---|---|---|---|
| 2012/0260563 A1 | 10/2012 | Marker et al. | |
| 2013/0341569 A1 | 12/2013 | Ampulski et al. | |
| 2014/0298716 A1 | 10/2014 | Marty et al. | |
| 2016/0251611 A1 | 9/2016 | Ottonello et al. | |
| 2016/0333519 A1* | 11/2016 | Radigan, II | C12P 7/10 |

FOREIGN PATENT DOCUMENTS

| | | | | |
|---|---|---|---|---|
| CN | 101058948 A | 10/2007 | | |
| CN | 102949969 B | 9/2014 | | |
| CN | 104212531 A | 12/2014 | | |
| CN | 206810626 | 12/2017 | | |
| DE | 102017119573 A1 * | 2/2019 | ............. | C12P 19/02 |
| JP | 2012-509163 A | 4/2012 | | |
| JP | 2012-512270 A | 5/2012 | | |
| JP | 2015-527425 A | 9/2015 | | |
| JP | 2019-500446 A | 1/2019 | | |

OTHER PUBLICATIONS

English-language machine translation of DE 102017119573 A1 (Year: 2019).*
International Search Report for International Application No. PCT/FR2020/051045 dated Oct. 15, 2020, 2 pages.
International Written Opinion for International Application No. PCT/FR2020/051045 dated Oct. 15, 2020, 5 pages.
Chinese Office Action for Application No. 202080058605.X dated Jun. 29, 2023, 8 pages.
Japanese Notification of Reasons for Refusal for Application No. 2021-576621 dated Dec. 11, 2023, 8 pages.

* cited by examiner

*Primary Examiner* — James C Goloboy
(74) *Attorney, Agent, or Firm* — TraskBritt

(57) ABSTRACT

The disclosure relates to the field of solid biofuels obtained by steam cracking. More particularly, the disclosure relates to a process for the treatment of lignocellulosic biomass by steam cracking in which the obtained powder is treated in order to separate the particles into two categories according to a threshold value, and each category is treated differently.

10 Claims, No Drawings

STEAM CRACKING PROCESS COMPRISING A SEPARATION STEP AND DIFFERENTIAL TREATMENT OF THE OBTAINED PARTICLES ACCORDING TO A THRESHOLD VALUE

CROSS-REFERENCE TO RELATED APPLICATIONS

This application is a national phase entry under 35 U.S.C. § 371 of International Patent Application PCT/FR2020/051045, filed Jun. 17, 2020, designating the United States of America and published as International Patent Publication WO 2020/260799 A1 on Dec. 30, 2020, which claims the benefit under Article 8 of the Patent Cooperation Treaty to French Patent Application Serial No. 1906796, filed Jun. 24, 2019.

TECHNICAL FIELD

The present disclosure relates to the field of solid biofuels obtained by steam cracking. More particularly, the present disclosure relates to a process for the treatment of lignocellulosic biomass by steam cracking, in which the obtained powder is treated in order to separate the particles into two categories according to a threshold value, each category being treated differently.

BACKGROUND

The production of energy (electrical and thermal) of renewable origin can be achieved from the environment (sun, wind, tide, swell, geothermal, hydraulic) or from biomass. With the exception of biomass, river or barrage hydraulics, and geothermal, these renewable energies are intermittent, unless the energy storage means develop. Only biomass is a primary energy that can be transported to the site of its transformation into heat and/or electricity. However, the biomass is, in fact, an energy that is not very dense, is variable, and is perishable. The transformation of lignocellulosic biomass (wood, agricultural waste, co-products of agriculture and the agro-industry) into an energy-dense, transportable, and easily storable compound, makes it possible to develop and consolidate a stationary energy industrial sector (biofuel used at a fixed point, at home, in contrast with biofuel oils), and to reduce the environmental impacts ($CO_2$ fossil emission, with a biomass without fertilizers or phytosanitaries).

The heat treatment of the biomass by steam cracking allows for this densification of energy, by homogenizing the biomass into a steam-cracked powder according to precise parametric conditions, in particular, size grading, temperature, and residence time. The powder is then pelletized in order to facilitate the transport, storage and use thereof.

It is thus a question of ensuring that the steam cracking method is capable of ensuring a constant product, i.e., an output powder that is stable in terms of quality, and is capable of being transformed or used downstream of the method, for the desired application. This powder has a calorific value and a composition suitable for being used in combustion, and is able to be pelletized.

Today, the best solution for guaranteeing the best result of the steam cracking is to make a regular and controlled supply of biomass of the same quality. However, with a view to increasing the volumes of treatment of biomass, for the purpose of production of solid biofuels, it appears to be of interest to be able to also treat a heterogeneous biomass.

The parameters of the steam cracking process are critical, and, in order to facilitate the comparison of different options, a model has been developed that is based on the hypotheses that the kinetics of the process is of the first order and obeys the Arrhenius law, making it possible to develop the ordinate of the reaction (R0):

$$R0 = \int t \exp\left[(Tr-Tb)/14.75\right]dt$$

Where Tr is the reaction temperature (° C.), Tb is the baseline temperature (boiling point of water at atmospheric pressure: 100° C.), t is the residence time (min), and 14.75 is the conventional activation energy, supposing that the general method is hydrolytic, and the general conversion is of the first order. The log 10 value of the ordinate of the reaction gives the severity factor (or severity) that is used to represent the effects of the steam explosion on the biomass:

$$\text{Severity} = \log 10(R0)$$

The problem encountered when treating a heterogeneous biomass is that the powder obtained is itself heterogeneous, causing problems of pelletization. Indeed, depending on the nature of the initial biomass, and the conditions applied, the steam cracking will not have the same effect in terms of destructurization of the material. Thus, when the input material is heterogeneous, the severity conditions must be adjusted so as to not totally destructure the least resistant materials, which would adversely affect the pelletization. When the severity conditions are adjusted depending on the less resistant biomass, the steam cracking generates residual particles originating from the more resistant biomasses, which also disrupt the pelletization process.

Failure to respect the final quality and the pelletization specifications may be fatal, whether due to a treatment that leaves large particles, or a treatment that is too drastic and degrades the product and its behavior upon pelletization.

There is, therefore, a need to have access to a steam cracking process that is suitable for treatment of a heterogeneous biomass for the manufacture of black pellets of a controlled quality.

The steam-cracking differs from hydrothermal pre-treatment, also referred to as aqueous fractionation, solvolysis, hydrothermolysis, or hydrothermal treatment, in that the latter comprises using water at a high temperature and high pressure in order to promote the disintegration and the separation of the lignocellulosic matrix. This technique is not suitable for the production of black pellets, since the products obtained are largely liquid.

The pyrolysis is the chemical decomposition of an organic compound by intense heating in the absence of oxygen. The compounds obtained following pyrolysis differ, in terms of their characteristics, from those obtained by steam cracking. The steam cracking cannot be likened to a pyrolysis technique, in that it uses steam explosion and is carried out in the presence of oxygen.

It is also necessary to distinguish torrefaction processes, which are characterized by a thermochemical treatment of between 100° C. and 300° C., which makes it possible to modify some of the organic material in order to break the fibers, while eliminating the water.

Chinese Patent No. CN102 949 969A discloses a system for pyrolysis of solid carbon material or material having an increased viscosity, using a duvet mixer and a catalytic heat transfer fluid heater, and a process for using the reactor system. This process further comprises a solid/solid or solid/liquid separator, for allowing the separation of the solid or liquid pyrolyzed products from the used catalytic heat transfer fluid.

U.S. Patent Publication No. US2012/260563A1 describes a process for thermochemical transformation of biomass by hydropyrolysis (conventional pyrolysis liquid reaction, with hydrogen and in the presence of solid catalysts) in order to obtain liquid products. This process comprises, in particular, inertial separation devices.

U.S. Patent Publication No. US2014/298716A1 relates to a process for drying and torrefaction of lignocellulosic biomass. The drying and torrefaction facility comprises two circuits. The second circuit comprises a cyclone separator that makes it possible to eliminate all the large volatile particles.

Finally, U.S. Patent Publication No. US2016/251611A1 discloses a process for growing a microbial organism, comprising the cultivation of the microbial organism in the presence of a hydrolyzed composition obtained from a lignocellulosic feedstock that has undergone a step of steam explosion. The treated lignocellulosic biomass furthermore comprises a step of separation of the fibers depending on a threshold value, such as the size of the fibers.

The known solutions are not entirely satisfactory, since they use cost-prohibitive techniques or use a non-pulverulent product. Indeed, these are techniques of:
  pyrolysis leading to obtaining compounds different from those obtained by steam cracking; and
  torrefaction, which is a technology having an acceptable yield (10% to 20% loss), but the cost remains prohibitive and the technology is not mature.

BRIEF SUMMARY

In order to meet this need, a process for steam cracking, with a given severity factor, has been developed, wherein the process comprises a step of treatment of the pulverulent products in order to separate the particles above a threshold value and the particles below the threshold value, and of differentiated treatment of particles of the first category and particles of the second category.

The process makes it possible, on the one hand, to pelletize a homogeneous powder from which resistant particles have been removed and, on the other hand, to treat the overflow of poorly deteriorated material by a return to the steam cracking tank or another deferred treatment.

The disclosure also relates to a steam cracking facility for implementing this process, comprising a particle separator.

The disclosure implements a screen for separating the poorly degraded resistant particles from the powder that can be pelletized, or the powder having too fine a size grading from the powder that can be pelletized.

The main advantage of this process is that it makes it possible to produce black pellets of quality, from any type of biomass and, in particular, from heterogeneous biomass. Indeed, eliminating the poorly degraded particles from the powder to be pelletized improves the quality of the pellets, which are thus more cohesive, more hydrophobic, and higher-energy.

This process thus makes it possible to comply both with the specifications of the overall pelletization process, and of the specification of the final product, in terms of quality and consistency of quality.

This process makes it possible to recover the poorly degraded particles and to re-use them. It may be a question of subjecting them a second time to a steam cracking treatment, or of using them for other purposes.

It is also possible to eliminate, by the screen, the finest powders that pelletize poorly, and to keep only the powders that are capable of clogging, with the aim of producing pellets. It is possible, for example, to envisage using the finest powders in biotransformation processes.

It will be noted that, if the increase in the severity of the treatment could manage to overcome the issue of particles that remain coarse, this would result in degradation of the more labile wood particles, and would also increase the material loss on account of too advanced degradation of molecules in polymer form into volatile compounds (for example, the hemicelluloses that are most sensitive to the temperature and to the residence time). There is, therefore, an advantage in recycling, into the head of the process, the post-steam cracking screen overflow of the powder, rather than increasing the severity, or indeed subjecting them, in isolation or in a manner grouped together, to more suitable severity conditions.

DETAILED DESCRIPTION

The disclosure relates first to a process for steam cracking of a lignocellulosic biomass, wherein the process comprises a step of treatment of the pulverulent products in order to separate the particles above a threshold value and the particles below the threshold value, and of differentiated treatment of particles of the first category and particles of the second category.

A process of this kind comprises the following steps:
  steam cracking of a lignocellulosic biomass;
  screening the pulverulent products obtained by steam cracking, in order to separate the particles above a threshold value (referred to as the "first category") and the particles below the threshold value (referred to as the "second category"); and
  differentiated treatment of the particles of the first category and of the particles of the second category.

The severity factor applied during the steam cracking step will be determined depending on the biomass to be treated. It is determined from the value of the Log 10 of the ordinate of the reaction.

$$\text{Severity} = \log 10(R0)$$

This is a characteristic that is inherent to the steam cracking process, which a person skilled in the art knows how to measure and adapt. Typically, the severity factor will be between 4.0 and 4.02, and more precisely between 4.05 and 4.15.

This process implements screening that aims to separate the steam cracking particles into two categories, with the aim of differentiated treatment. The threshold value can, for example, be the mass, the dimension, the cross-sectional area, or the density of the particles, but also their aeraulic behavior, or any other criterion that makes it possible to separate the particles that are too fine, too large, too dense, etc., compared with a threshold value.

In a preferred embodiment, one of the two categories of particles is pelletized for the preparation of black pellets.

In a particular embodiment, the particles to be pelletized correspond to the category of particles that are above the threshold value. It is a question of eliminating the largest and/or the most dense and/or the most resistant particles.

In an alternative embodiment, the particles to be pelletized correspond to the category of particles that are above the threshold value. It is a question of eliminating the particles that are too fine and are not able to be pelletized.

Among the other expected qualities such as the water resistance, the mechanical strength, and the high calorific value, in a general manner, the black pellets may be qualified by a main constitution (>80%) of particles of a size smaller than 500 and a few percent of particles larger than a millimeter, or indeed several millimeters.

The resistance of the pellets to water can be evaluated by soaking, i.e., the product must not take up much water during soaking, and the qualities of the product, such as its mechanical strength, must not be altered following soaking.

The mechanical strength of the pellets is associated with an impact resistance and a mechanical durability.

The calorific value of the pellets must be increased with respect to that of the initial biomass.

The severity factor of the steam cracking step is fixed according to the nature of the biomass and the type of powder that is desired to collect.

The particles that are eliminated undergo a treatment different from pelletization, and are collected and recycled, for example, by reintroduction into the steam cracking tank, immediately after separation or in a deferred manner, or by re-use in other processes.

There are as many different possibilities for treatment of the eliminated particles as there are particular embodiments of the disclosure.

In a particular embodiment, the particles above the threshold value (resistant, too large and/or too dense, for example) are reintroduced directly into the steam cracking tank in order to be treated again within the continuous process.

In another particular embodiment, the particles above or below the threshold value are collected in order to be recycled in a deferred manner. They can be subsequently reintroduced into the steam cracking tank under different severity conditions, or be re-used in other processes. The particles that are too fine to be pelletized can, for example, be used as a substrate for biotransformation reactions, such as biotechnological processes and green chemistry, etc. The particles that are too large can be re-used by means of local combustion in a boiler, or can be reintegrated into biomaterials.

This process thus makes it possible to treat a heterogeneous biomass and to re-use all of this biomass.

The heterogeneous biomass may comprise a mixture of young woods and old woods, a mixture of woods originating from different species, waste wood, etc.

The disclosure also relates to a steam cracking facility comprising at least one steam cracking unit, and a separator for separating particles into two categories depending on a threshold value, and a means for the transport of the particles thus separated.

The steam cracking facility is a conventional facility with regard to the elements up to the powder collector located at the outlet of the steam cracking tank. The particle separator may be of any type, and depends on the criterion selected for the screen. The screening means may thus be a separation by size selection, such as a rotary screen, a perforated or inclined vibrating table, dynamic densimetric separation such as a ballistic screen, or a centrifugal effect.

The means for differential transport of the particles makes it possible to transport the overflow powder to a site of immediate treatment or to a storage site for deferred treatment. A transport means of this kind may be a conveyor, a chute, a screw, a chain conveyor, a pneumatic system, etc.

The facility may furthermore comprise items of equipment associated with the treatment of the overflow downstream.

The invention claimed is:

1. A method of steam cracking a lignocellulosic biomass, the method comprising:
   steam cracking a lignocellulosic biomass;
   screening pulverulent products obtained at an end of the steam cracking and separating a first category of particles exhibiting a parameter above a threshold value from a second category of particles exhibiting a parameter below the threshold value;
   removing the first category of particles and pelletizing the second category of particles; and
   collecting and recycling the first category of particles by reintroducing the first category of particles into a steam cracking tank immediately or in a deferred manner.

2. The method of claim 1, wherein the parameter is selected from the group consisting of: mass, dimension, cross-sectional area, density of the particles, and aeraulic behavior of the particles.

3. The method of claim 1, further comprises re-using the first category of particles in a combustion process or by integrating the first category of particles into a biomaterial.

4. The method of claim 1, wherein the lignocellulosic biomass is heterogeneous.

5. The method of claim 1, wherein the parameter is selected from the group consisting of: mass, cross-sectional area, density of the particles, and aeraulic behavior of the particles.

6. The method of claim 1, wherein the parameter is density of the particles of aeraulic behavior of the particles.

7. A method of steam cracking a lignocellulosic biomass, the method comprising:
   steam cracking a lignocellulosic biomass;
   screening pulverulent products obtained at an end of the steam cracking and separating a first category of particles exhibiting a parameter above a threshold value from a second category of particles exhibiting a parameter below the threshold value;
   removing the second category of particles and pelletizing the first category of particles; and
   re-using the second category of particles in biotechnology or a green chemistry process.

8. The method of claim 7, wherein the lignocellulosic biomass is heterogeneous.

9. The method of claim 7, wherein the parameter is selected from the group consisting of: mass, dimension, cross-sectional area, density of the particles, and aeraulic behavior of the particles.

10. The method of claim 7, wherein the parameter is density of the particles of aeraulic behavior of the particles.

* * * * *